(12) United States Patent
Niwa et al.

(10) Patent No.: US 10,713,757 B2
(45) Date of Patent: Jul. 14, 2020

(54) IMAGE PROCESSING APPARATUS, CONTROL METHOD THEREOF, AND STORAGE MEDIUM

(71) Applicant: CANON KABUSHIKI KAISHA, Tokyo (JP)

(72) Inventors: Masashi Niwa, Ichikawa (JP); Masanao Motoyama, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 16/127,367

(22) Filed: Sep. 11, 2018

(65) Prior Publication Data
US 2019/0005622 A1    Jan. 3, 2019

Related U.S. Application Data

(63) Continuation of application No. PCT/JP2017/004725, filed on Feb. 9, 2017.

(30) Foreign Application Priority Data

Mar. 18, 2016 (JP) .................... 2016-055542

(51) Int. Cl.
*G06T 3/00* (2006.01)
*G06T 3/60* (2006.01)
(Continued)

(52) U.S. Cl.
CPC .............. *G06T 3/606* (2013.01); *G06T 5/002* (2013.01); *G06T 5/50* (2013.01); *G06T 7/223* (2017.01);
(Continued)

(58) Field of Classification Search
None
See application file for complete search history.

(56) References Cited

U.S. PATENT DOCUMENTS

2007/0297694 A1    12/2007  Kurata
2013/0121605 A1*   5/2013  Imada ................. G06T 5/50
                                                             382/254
(Continued)

FOREIGN PATENT DOCUMENTS

JP          06-237396 A       8/1994
JP          2002-300428 A    10/2002
(Continued)

OTHER PUBLICATIONS

International Search Report dated May 16, 2017, issued in corresponding International Patent Application No. PCT/JP2017/004725.

*Primary Examiner* — Delomia L Gilliard
(74) *Attorney, Agent, or Firm* — Venable LLP

(57) ABSTRACT

An image processing apparatus including an input unit configured to input image data of a target frame, a first processing unit configured to perform a first processing for output image data of a reference frame related to the target frame, which is stored in the memory, to change positions of pixels in the output image data, an image processing unit configured to perform image processing for the image data of the target frame input by the input unit based on the output image data of the reference frame processed by the first processing unit, and a second processing unit configured to perform a second processing, the second processing being according to the first processing, for the image data of the target frame for which image processing has been performed by the image processing unit and to store the processed image data in the memory as output image data of the target frame.

18 Claims, 16 Drawing Sheets

(51) Int. Cl.
  *G06T 5/50*    (2006.01)
  *H04N 5/21*    (2006.01)
  *H04N 5/235*   (2006.01)
  *G06T 5/00*    (2006.01)
  *H04N 5/355*   (2011.01)
  *H04N 5/232*   (2006.01)
  *G06T 7/223*   (2017.01)

(52) U.S. Cl.
  CPC ............... *H04N 5/21* (2013.01); *H04N 5/232* (2013.01); *H04N 5/2355* (2013.01); *H04N 5/35581* (2013.01); *G06T 2207/10016* (2013.01); *G06T 2207/10144* (2013.01); *G06T 2207/20021* (2013.01); *G06T 2207/20208* (2013.01)

(56)       References Cited

U.S. PATENT DOCUMENTS

2015/0281575 A1* 10/2015 Yamada ............. H04N 5/23238
                                                      348/36
2017/0208264 A1*  7/2017 Ajito ...................... H04N 5/349

FOREIGN PATENT DOCUMENTS

| JP | 2005-278073 A | 10/2005 |
| JP | 2008-005084 A |  1/2008 |

\* cited by examiner

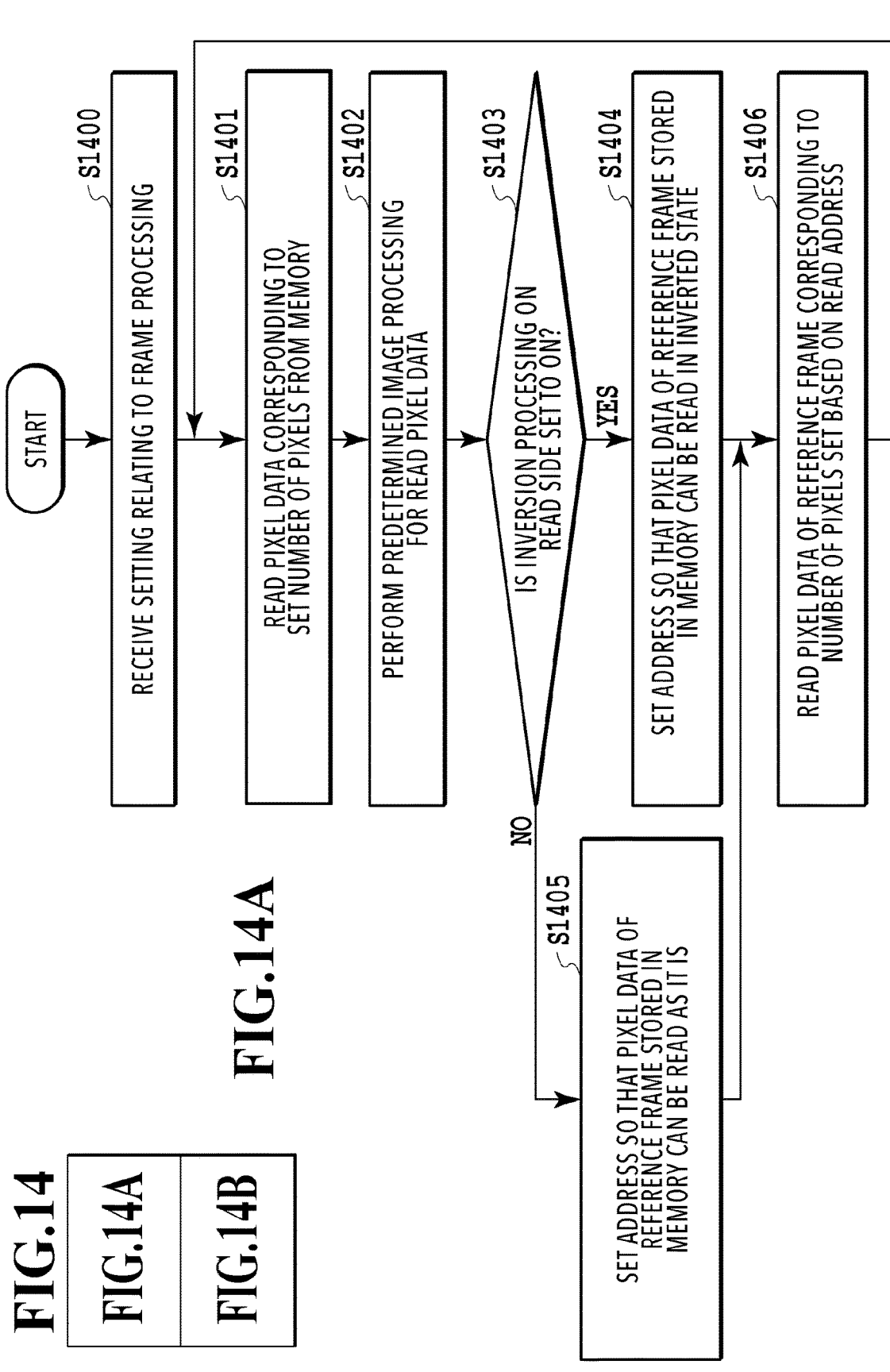

IMAGE PROCESSING APPARATUS, CONTROL METHOD THEREOF, AND STORAGE MEDIUM

CROSS-REFERENCE TO RELATED APPLICATIONS

This application is a Continuation of International Patent Application No. PCT/JP2017/004725, filed Feb. 9, 2017, which claims the benefit of Japanese Patent Application No. 2016-055542, filed Mar. 18, 2016, both of which are hereby incorporated by reference herein in their entirety.

BACKGROUND OF THE INVENTION

Field of the Invention

The present invention relates to a technique to perform image processing by using a plurality of pieces of image data in units of frames.

Background Art

In an image capturing apparatus, such as a video camera, in order to obtain a high image quality video image in which noise components included in a video image signal are reduced, noise removal (also called noise reduction and abbreviated to NR) processing is performed. Of the NR processing, a method in which frame data in the past is used cyclically and noise is removed based on information on a difference in frame data that changes over time is called cyclic NR processing. The cyclic NR processing brings about a significant effect despite that the algorithm is simple.

Further, geometrical conversion processing to rotate or to invert an image is used in many situations as basic image processing. For example, in a video camera, and the like, at the time of displaying an image on a display, processing, such as detecting an inclination by a gyro sensor, and the like, and rotating an image that is displayed in accordance with the detected inclination, is performed. Further, there exists a surveillance camera capable of rotating nearly 180 degrees with respect to the installation surface exists. In such a surveillance camera, it is necessary to rotate an image that is displayed by 180 degrees in accordance with the inclination of the camera. In a case when such rotation processing is implemented, image data is stored in a memory (DRAM) temporarily in many cases. The use of an internal buffer (SRAM) can be avoided and the circuit scale can be reduced by controlling the write address at the time of writing to the memory, or by controlling the read address at the time of reading from the memory.

Japanese Patent Laid-Open No. 2008-5084 discloses an apparatus that performs processing that is a combination of geometrical conversion processing and cyclic NR processing. Specifically, in the method disclosed in Japanese Patent Laid-Open No. 2008-5084, the rotation angle of a target screen with respect to a reference screen is calculated, as well the amount of translation between the target screen and the reference screen before the target screen is calculated. Then, by controlling the read address at the time of reading the pixel data of the target screen stored in the memory, the pixel data is read so that the target screen rotates by the calculated rotation angle as well as moving by the calculated amount of translation with respect to the reference screen. Then, by using the read pixel data of the target screen and the pixel data of the reference screen, the cyclic NR processing is performed.

However, in the case when the processing that requires a memory for storing frame data, represented by the cyclic NR processing as described above, and the inversion processing or the rotation processing are performed successively, writing and reading of a large amount of frame data for the memory will occur. In the method disclosed in Japanese Patent Laid-Open No. 2008-5084, both the pixel data of the target screen and the pixel data of the reference screen are read from the memory and the pixel data after the NR processing is also written to the memory. In the case when a large amount of frame data is processed via the memory as described above, many memory bands and memory areas are consumed, and, therefore, deterioration of the system performance and the increase in cost will result. In particular, in recent video image processing, the system that handles a large capacity of frame data compatible with a resolution of 4 k2 k or 8 k4 k increases in number, and, therefore, the influence thereof is large.

SUMMARY OF THE INVENTION

The image processing apparatus according to the present invention is an image processing apparatus including a memory being capable of storing output image data obtained by converting image data in units of frames, the image processing apparatus comprising an input unit configured to input image data of a target frame, a first processing unit configured to perform a first processing for output image data of a reference frame related to the target frame, which is stored in the memory, to change positions of pixels in the output image data, an image processing unit configured to perform image processing for the image data of the target frame input by the input unit based on the output image data of the reference frame processed by the first processing unit, and a second processing unit configured to perform a second processing, the second processing being according to the first processing, for the image data of the target frame for which image processing has been performed by the image processing unit and to store the processed image data in the memory as output image data of the target frame.

Further features of the present invention will become apparent from the following description of exemplary embodiments with reference to the attached drawings.

BRIEF DESCRIPTION OF THE DRAWINGS

FIG. 14 is a diagram showing a relationship between FIG. 14A and FIG. 14B;

FIG. 14A is a flowchart showing processing performed by the image processing unit.

DESCRIPTION OF THE EMBODIMENTS

In the following, embodiments for embodying the present invention are explained in detail. The following embodiments are not intended to limit the present invention and all combinations of features explained in the present embodiments are not necessarily indispensable to the solution of the present invention.

First Embodiment

Figure 1:
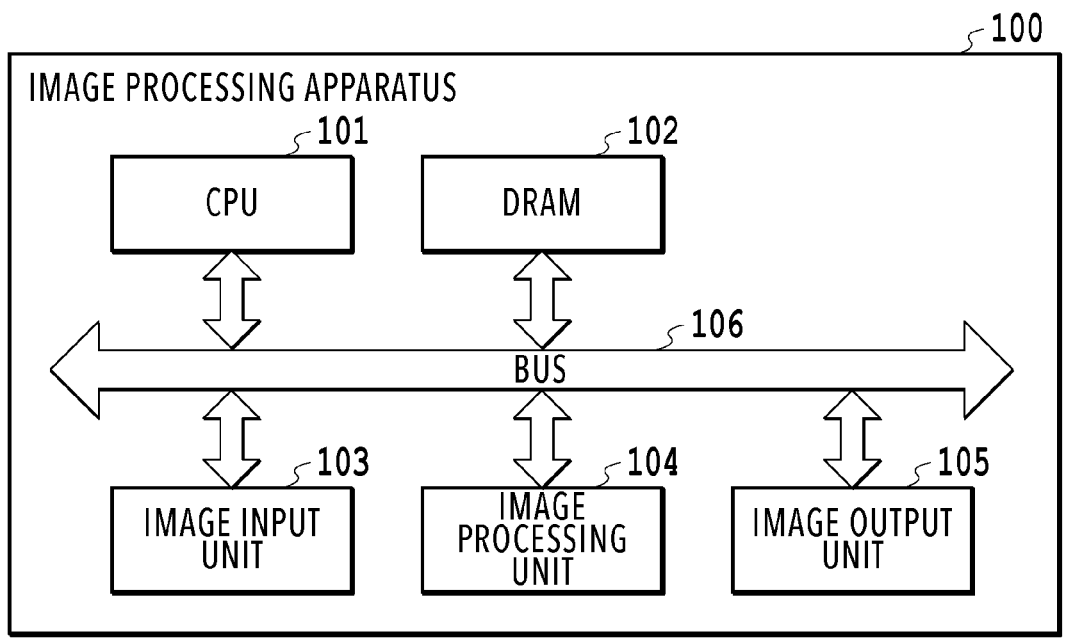
FIG. 1 is a block diagram showing a configuration example of an image processing apparatus according to a first embodiment.

The present embodiment relates to an image processing apparatus that handles moving image data, represented by an image capturing apparatus, and the like. FIG. 1 is a block diagram showing a configuration example of an image processing apparatus in the first embodiment. An image processing apparatus 100 has a CPU 101, a DRAM 102, an image input unit 103, an image processing unit 104, and an image output unit 105. These units are connected via a bus 106. The CPU 101 centrally controls the arithmetic operation processing and the operation of each unit of the image processing apparatus 100 by reading control programs stored in a ROM (not shown schematically) and executing the programs. The DRAM 102 is a readable and writable memory and is a storage medium for temporarily storing various kinds of data, such as frame data. The image input unit 103 stores data (frame data) of a captured image acquired by an image capturing element, such as a CMOS sensor, in the DRAM 102. The image processing unit 104 performs predetermined image processing including NR processing and rotation processing for the frame data of the image that is input by the image input unit 130 and stores the frame data after image processing in the DRAM 102. The image output unit 105 transfers the frame data after image processing via a network, stores the frame data in an external storage medium, such as a USB and an SD card, and so on.

Figure 2:
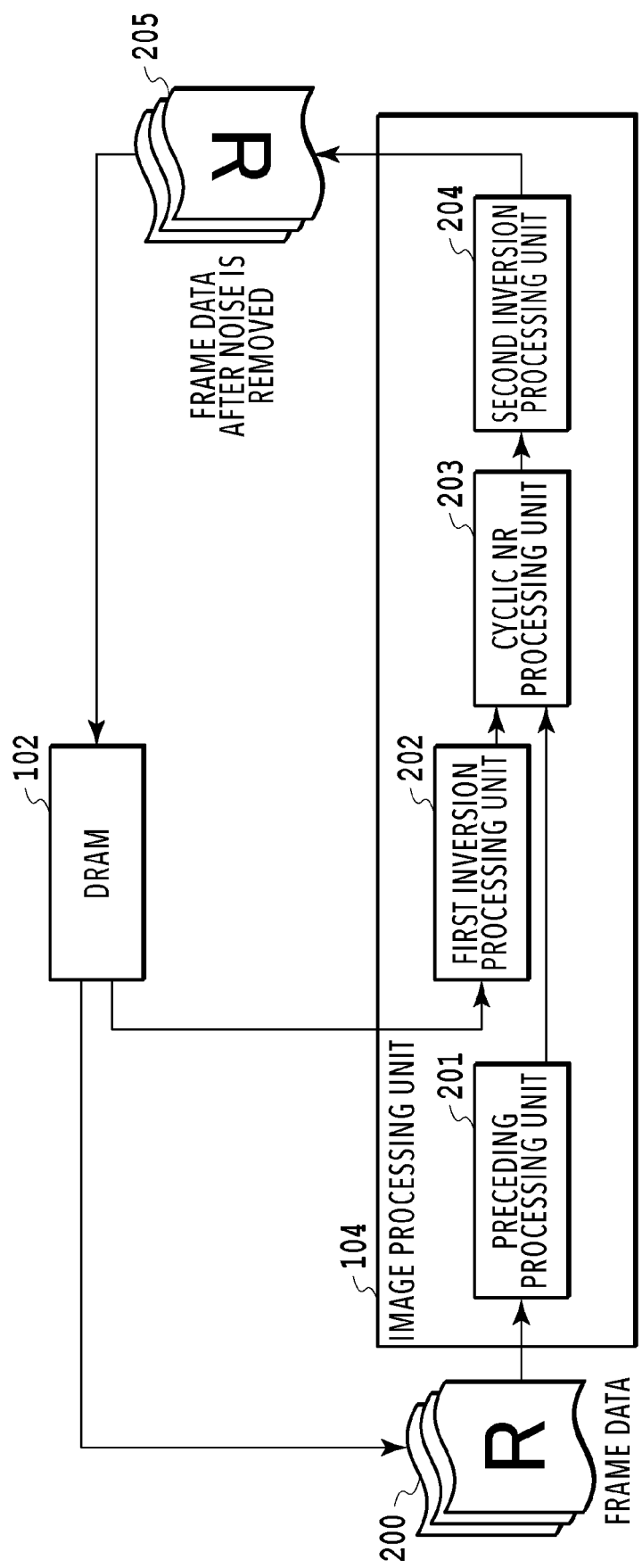
FIG. 2 is a block diagram showing a configuration example of an image processing unit according to the first embodiment.

FIG. 2 is a block diagram showing a configuration example of the image processing unit 104 according to the present embodiment. The image processing unit 104 has a preceding processing unit 201, a cyclic NR processing unit 203, a first inversion processing unit 202, and a second inversion processing unit 204. In the present embodiment, the preceding processing unit 201, the cyclic NR processing unit 203, the first inversion processing unit 202, and the second inversion processing unit 204 of the image processing unit 104 are implemented by dedicated circuits.

Here, an image capturing apparatus that adopts the configuration such as this is explained by taking a surveillance camera as an example. The surveillance camera that is suspended from the ceiling includes one capable of capturing a wide area of the surroundings by freely changing the inclination of the camera from about 0 degrees to 180 degrees in the vertical direction with respect to the ceiling. With the surveillance camera such as this, an object that is captured by an image capturing element inverts vertically between the case when the inclination of the camera with respect to the ceiling is 90 degrees or more and the case when the inclination is less than 90 degrees. In order for a user to recognize an image without a feeling of incongruity in the process to move the surveillance camera, it is necessary to change the positions of pixels included in the image data by rotating the image data that is output by 180 degrees while frames are sequentially input. This is implemented by switching on/off setting of inversion and rotation between frames. However, in the processing that refers to the previous frame, for example, such as the cyclic NR processing, it is necessary to read the image data of the previous frame in the state where the image data of the previous frame is not inverted or rotated with respect to the processing-target frame. With the method of cyclic NR of Japanese Patent Laid-Open No. 2008-5084, the presence/absence of rotation of image data is different before and after switching on/off setting of rotation, and, therefore it is not possible to apply the method to the case of the use of the surveillance camera as described above. Further, both in the case when the cyclic NR processing is performed first and in the case when the rotation processing is performed first, reading and writing of frame data from and to the memory are performed many times, and, therefore, the memory band and the memory area that are used increase. In the following, the configuration of the present embodiment that resolves the above-described problem is explained in detail with reference to FIG. 2.

In the image processing unit 104 in the present embodiment, the preceding processing unit 201 reads frame data 200 from the DRAM 102 and performs predetermined image processing. The image processing that is performed by the preceding processing unit 201 includes, for example, filter processing, color conversion processing, and so on, but the image processing is not limited to those. It is possible for the cyclic NR processing unit 203 to receive frame data from the preceding processing unit 201 without intervention of the DRAM 102. That is, the cyclic NR processing unit 203 receives frame data for which neither inversion processing nor rotation processing has been performed from the preceding processing unit 201. In the present embodiment, it is assumed that the data processing that is performed by the preceding processing unit 201 and the cyclic NR processing unit 203 is performed by a raster scan for frame data, but the data processing may be performed by a rectangular scan, such as block processing. The cyclic NR processing unit 203 makes an attempt to reduce noise by superimposing the frame data one previous in terms of time, which is received from the first inversion processing unit 202, on the frame data received from the preceding processing unit 201.

It is possible for each of the first inversion processing unit 202 and the second inversion processing unit 204 to switch between on setting and off setting of the inversion processing between frames by parameters set individually by the CPU 101. For example, the second inversion processing unit 204 has an SRAM storing data corresponding to one line of the frame data (image data). Then, in the case when the inversion processing is set to on, the second inversion processing unit 204 temporarily stores the input data in the SRAM and outputs frame data 205 in which the positions of pixels are inverted in units of lines. On the other hand, in the case when the inversion processing is set to off, the second inversion processing unit 204 outputs the input data as it is without inverting the positions of pixels in the input data. The first inversion processing unit 202 executes a rotation process according to the second inversion processing unit 204, thereby returning the inverted frame data stored in the memory to the state before being inverted. Therefore, the operation in the first inversion processing unit 202 also performs the same operation as that of the second inversion processing unit 204.

Then, for example, in the case when the on/off setting of the inversion is switched from off to on between frames, before the processing of the first frame after switching (here, simply called a first frame), the CPU 101 performs the setting to set the inversion processing to on for the second inversion processing unit 204. At this time, the inversion processing has not been performed for the image data of the previous frame stored in the DRAM 102, and, therefore, the setting of the inversion processing for the first inversion processing unit 202 is left off. Then, in the case when the processing of the first frame is completed, the image data of the first frame for which the inversion processing has been performed is stored in the DRAM 102. After the processing of the first frame is completed, before the processing of the second frame, the CPU 101 performs the setting to set the inversion processing to on for the first inversion processing unit 202. Due to this, the inversion processing is further performed for the image data of the first frame for which the inversion processing has been performed (that is, the state returns to the original state) and then the image data is input to the cyclic NR processing unit 203. That is, by further inverting the image data of the first frame, which is stored in the DRAM 102 in the state where the inversion processing has been performed, it is possible to match the phase of the image data of the first frame with that of the image data of the second frame before inversion. In the following, the inversion processing performed by the first and second inversion processing units 202 and 204 and the cyclic NR processing performed by the cyclic NR processing unit 203 in the present embodiment are explained in detail.

[Inversion Processing]

Figure 3:
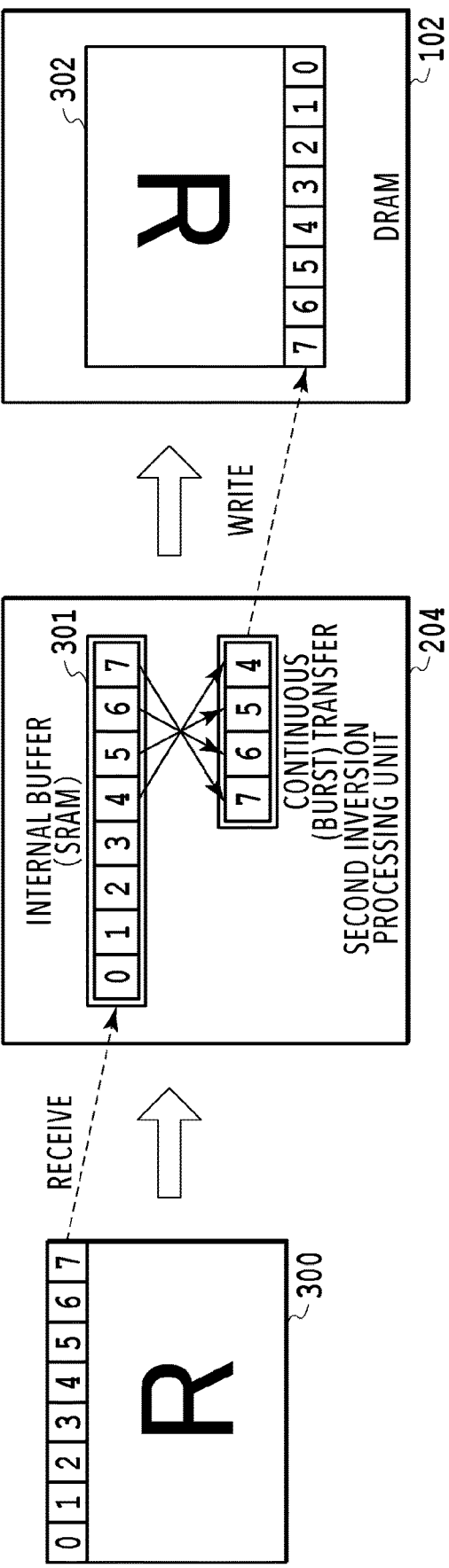
FIG. 3 is a diagram showing the way a second inversion processing unit stores data in a DRAM at the time of inversion processing being set to on according to the first embodiment.

FIG. 3 is a diagram showing the way the second inversion processing unit 204 stores data in the DRAM 102 at the time of inversion processing being set to on. The second inversion processing unit 204 stores frame data 300 whose noise has been reduced by the cyclic NR processing unit 203 in an internal buffer (SRAM) 301 storing image data for each line. By the second inversion processing unit 204 writing the data rearranged into the order opposite to the order of received pixels to the DRAM 102 after receiving the data corresponding to the internal buffer, the inverted frame data (image data) corresponding to one line is obtained. By performing the processing such as this for all the lines of the frame data, the inversion processing is performed. Further, by writing the frame data in the order from the address corresponding to the lowermost line of the frame in the frame memory area on the DRAM 102, it is also possible to perform the vertical inversion processing at the same time. By changing the write order and the top address of the write destination as described above, it is possible to obtain frame data 302 rotated by 180 degrees on the DRAM 102.

On the other hand, the inversion processing in the first inversion processing unit 202 is implemented by the setting of the top address read from the DRAM 102 and the control of the transfer order at the time of transferring the read data to the cyclic NR processing unit 203. The inversion processing of the first inversion processing unit 202 is the same as the processing of the second inversion processing unit 204, and, therefore, a detailed description is omitted.

The image data stored by the first and second inversion processing units 202 and 204 is not limited to data in units of lines. For example, data may be in units of write burst lengths and due to this, it is possible to reduce the internal buffer (SRAM) possessed by each inversion processing unit. Further, the example is explained in which the image is rotated by 180 degrees by the second inversion processing unit 204 controlling the write order and the top address of the write destination, but the example is not limited to this. Inversion by controlling the order of pixels including reading, or inversion by changing the top address may be accepted. Further, rotation processing that composes the control and the change may be accepted and this also applies to the first inversion processing unit.

[Cyclic NR Processing]

Figure 4A:
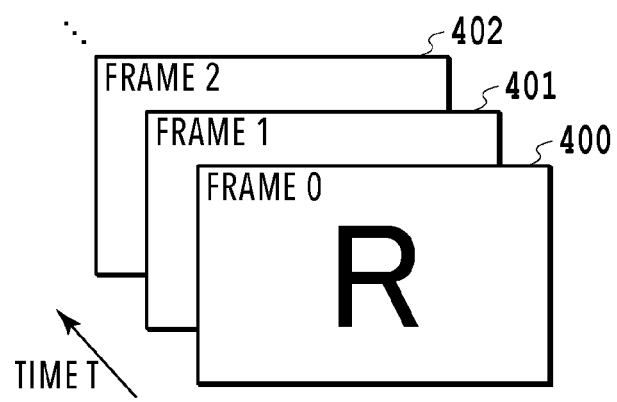
FIG. 4A is a diagram schematically showing frame data according to the first embodiment.
Figure 4B:
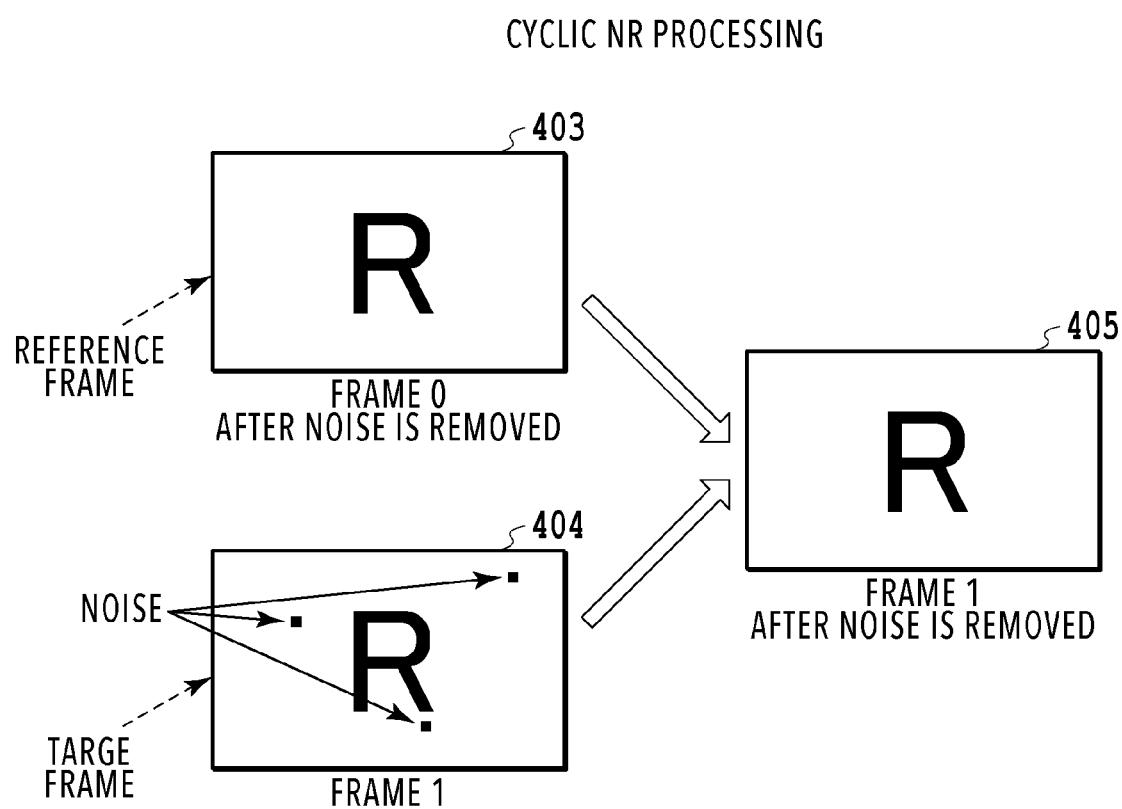
FIG. 4B is a diagram schematically showing cyclic noise reduction processing according to the first embodiment.

FIG. 4A is a diagram schematically showing frame data that is input from the image input unit 103. It is assumed that the frame data that is input is input in the order from the frame data whose number is the lowest, that is, frame 0 (400)→frame 1 (401)→frame 2 (402). FIG. 4B is a diagram schematically showing cyclic noise reduction processing. It is assumed that frame data 404 received from the preceding processing unit 201 is taken to be a processing-target frame (hereafter, called target frame) and frame data 403 one before the target frame is taken to be a reference frame. That is, it can be said that the reference frame is a frame relating to the target frame in terms of time. The reference frame is a frame for which the noise removal processing has already been performed. The cyclic NR processing is processing to make an attempt to reduce noise of the target frame by superimposing the image data of the reference frame on the image data of the target frame. Frame data 405 of the target frame from which noise has been reduced is used as a reference frame for reducing noise from the next frame data. One example of the cyclic NR processing is described, but the present embodiment is not limited to the example. For example, it may also be possible to use the image data several frames before the target frame as a reference frame, or to refer to a plurality of pieces of frame data for one target frame.

It is possible for the cyclic NR processing unit 203 to receive frame data in the order of the data before the inversion processing by reading the frame data after the inversion processing via the first inversion processing unit 202. By making such a configuration, it is possible to omit storing the frame data after the NR processing and before the inversion processing in the DRAM 102 and compared to the case when the inversion processing unit 202 is not provided, it is possible to reduce the memory band corresponding to at least one frame for each piece of frame processing. Further, as in the example of the surveillance camera described previously, also in the case when it is desired to switch between the on setting and off setting of rotation while frames are sequentially input, it is possible to perform the NR processing also at the time of switching of inversion of the target frame and the reference frame by adopting the configuration explained in the present embodiment.

Figure 5:
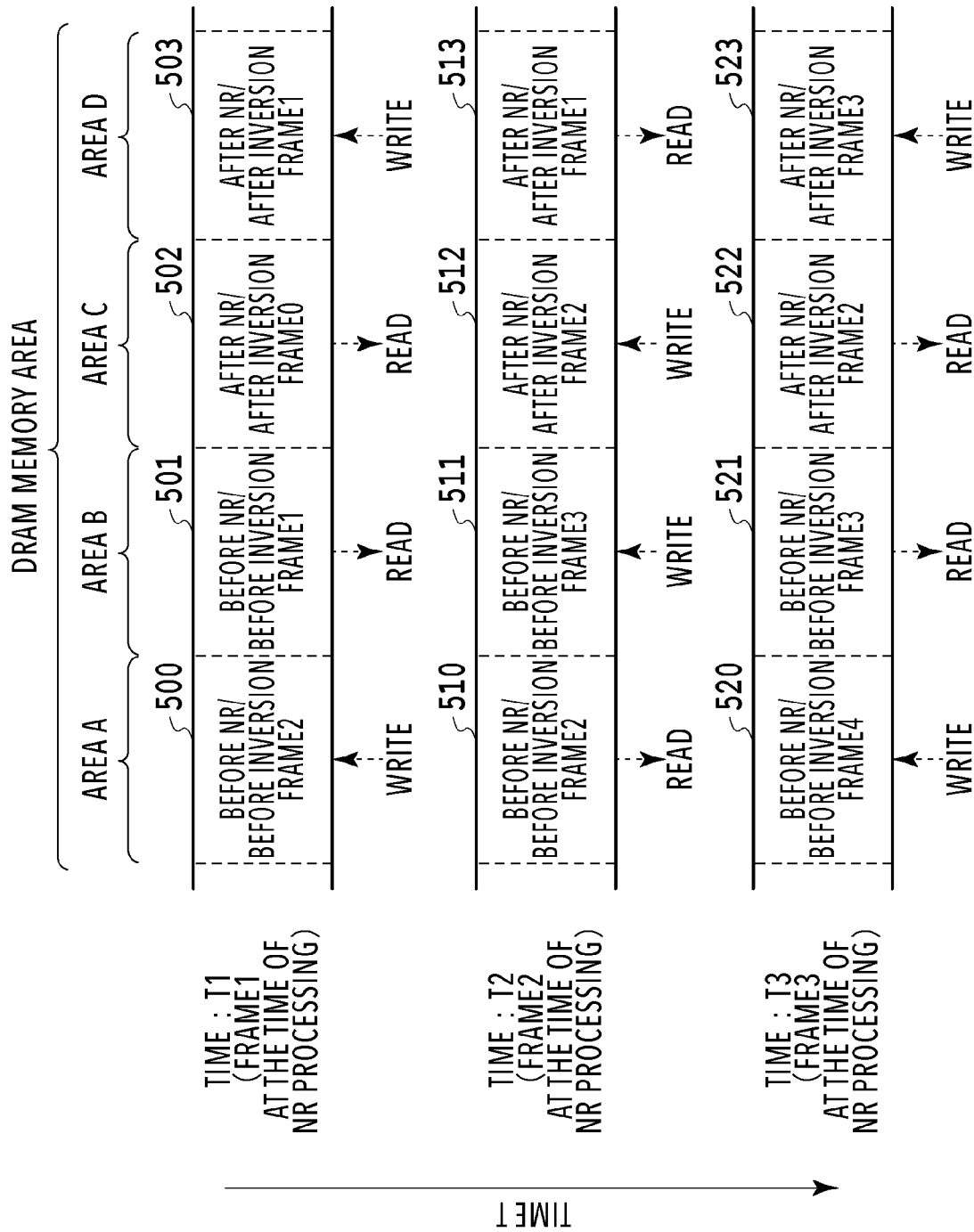
FIG. 5 is a diagram showing a transition of memory use areas according to the first embodiment.

Following the above, the frame memory area on the DRAM 102, which is necessary in the present embodiment, is explained. FIG. 5 shows a transition of frame data that is stored in each area (areas A, B, C, and D) of the DRAM 102 at the time of the frame data being read from the DRAM 102 and being written to the DRAM 102. It is assumed that the frame that is processed by the cyclic NR processing unit 203 moves in the order of frame 1, frame 2, and frame 3 as time passes as T1, T2, and T3. Hereafter, the frame before the NR processing and before the inversion processing is described as "before NR/before inversion frame", the frame after the NR processing and after the inversion processing as "after NR/after inversion frame", and so on.

In the case when the cyclic NR processing is performed for frame 1 (time T1), area A (500) is an area in which the image input unit 103 writes the image data of before NR/before inversion frame 2. Area B (501) is an area from which the preceding processing unit 201 reads the image data of before NR/before inversion frame 1. The preceding processing unit 201 transfers the image data for which the preceding processing has been performed to the cyclic NR processing unit 203 as a target frame. Area C (502) is an area from which the first inversion processing unit 202 reads after NR/after inversion frame 0. The first inversion processing unit 202 transfers the image data for which the inversion processing has further been performed to the cyclic NR processing unit 203 as a reference frame. Area D (503) is an area in which the second inversion processing unit 204 writes after NR/after inversion frame 1 obtained by performing the inversion processing for frame 1 after the NR processing received from the cyclic NR processing unit 203. The image processing unit 104 checks that each piece of processing has been completed in units of frames, and the processing moves to the next frame.

In the case when the cyclic NR processing is performed for frame 2 (time T2), in area A (510), the image data of before NR/before inversion frame 2 is stored, and the preceding processing unit 201 reads the image data and transfers the image data to the cyclic NR processing unit 203. In area B (511), the before NR/before inversion image data of frame 3 is written by the image input unit 103 by overwriting the image data of frame 1. In area C (512), the image data of after NR/after inversion frame 2 is written by the second inversion processing unit 204 by overwriting the data of frame 0. In area D (513), the image data of after NR/after inversion frame 1 is stored, and the first inversion processing unit 202 reads the image data and transfers the image data to the cyclic NR processing unit 203. Although details in the case when the cyclic NR processing is performed for frame 3 (time T3) are omitted, similarly area A and area B, and area C and area D operate as a double buffer and reading and writing are exchanged. By doing so, the waiting time until completion of the preceding processing and the subsequent processing is reduced and it is possible to increase the speed of processing by parallel processing. Further, in the present embodiment, as is known from FIG. 5, it is not necessary to store frame data after the NR processing and before the inversion processing on the DRAM 102. Because of this, it is possible to reduce the memory area that is used compared to the case when the frame data is written to the memory after the cyclic NR processing and after the rotation processing, respectively.

As explained above, according to the present embodiment, in the case when the cyclic processing that refers to a plurality of frames and the rotation processing are performed successively, it is possible to reduce the number of times the frame data is written to the memory and to reduce the memory band and the memory area that are used.

Second Embodiment

In the following, a second embodiment is explained. In the first embodiment described above, the configuration having the first and second inversion processing units 202 and 204 as shown in FIG. 2 and implementing rotation and inversion by the control of the order of reading and writing and the top address is described. In the present embodiment, a configuration having a geometrical conversion processing unit and performing rotation processing for frame data after cyclic NR processing by a coordinate arithmetic operation is explained to change the positions of pixels.

Figure 6:
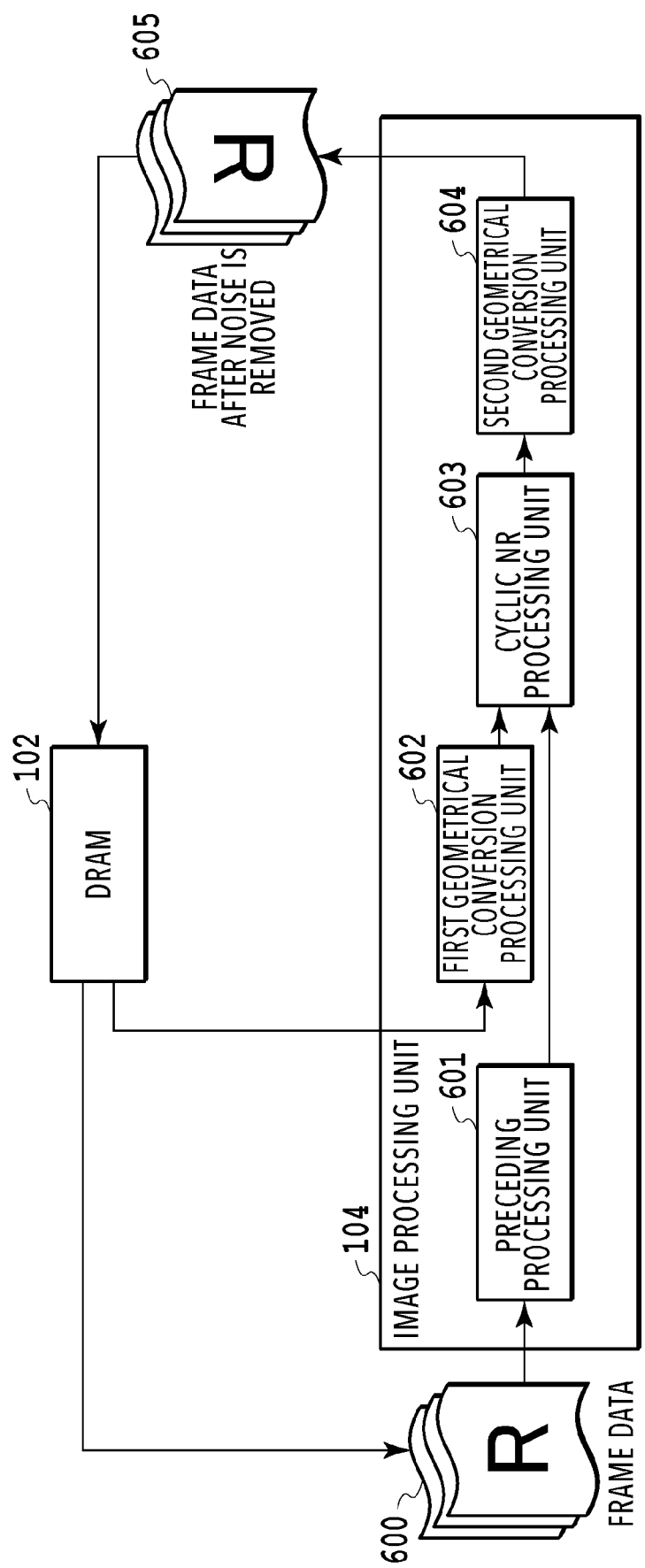
FIG. 6 is a block diagram showing a configuration example of an image processing unit according to a second embodiment.

FIG. 6 is a block diagram showing a configuration of the image processing unit 104 in the present embodiment. The image processing unit 104 has a preceding processing unit 601, a cyclic NR processing unit 603, a first geometrical conversion processing unit 602, and a second geometrical conversion processing unit 604. In the image processing unit 104 of the present embodiment, the processing of the preceding processing unit 601 and that of the cyclic NR processing unit 603 are the same as the processing of the preceding processing unit 201 and that of the cyclic NR processing unit 203 in the first embodiment, respectively, and, therefore, explanation is omitted.

The second geometrical conversion processing unit 604 performs geometrical conversion processing for frame data after NR processing received from the cyclic NR processing unit 603 and stores the frame data in the DRAM 102. Here, for explanation to be described later, the rotation angle of the frame data before the geometrical conversion processing by the second geometrical conversion processing unit 604 is referred to as a first rotation angle and the rotation angle of the frame data after the geometrical conversion processing by the second geometrical conversion processing unit 604 is referred to as a second rotation angle. The first geometrical conversion processing unit 602 performs the geometrical conversion processing for the frame data saved with the second rotation angle, which is stored on the DRAM 102, so as to have the first rotation angle and inputs the frame data to the cyclic NR processing unit 603 as reference data. It is possible for the first and second geometrical conversion processing units 602 and 604 to switch between outputting input data after performing geometrical conversion processing and outputting the input data as it is by a flag that is set by the CPU 101 for each frame. As a method of geometrical conversion processing that is performed generally, there is an implementation method by a coordinate arithmetic operation, such as affine transformation. In the following, details of the geometrical conversion processing using affine transformation in the present embodiment are explained by using FIG. 7 and FIG. 8.

Figure 7:
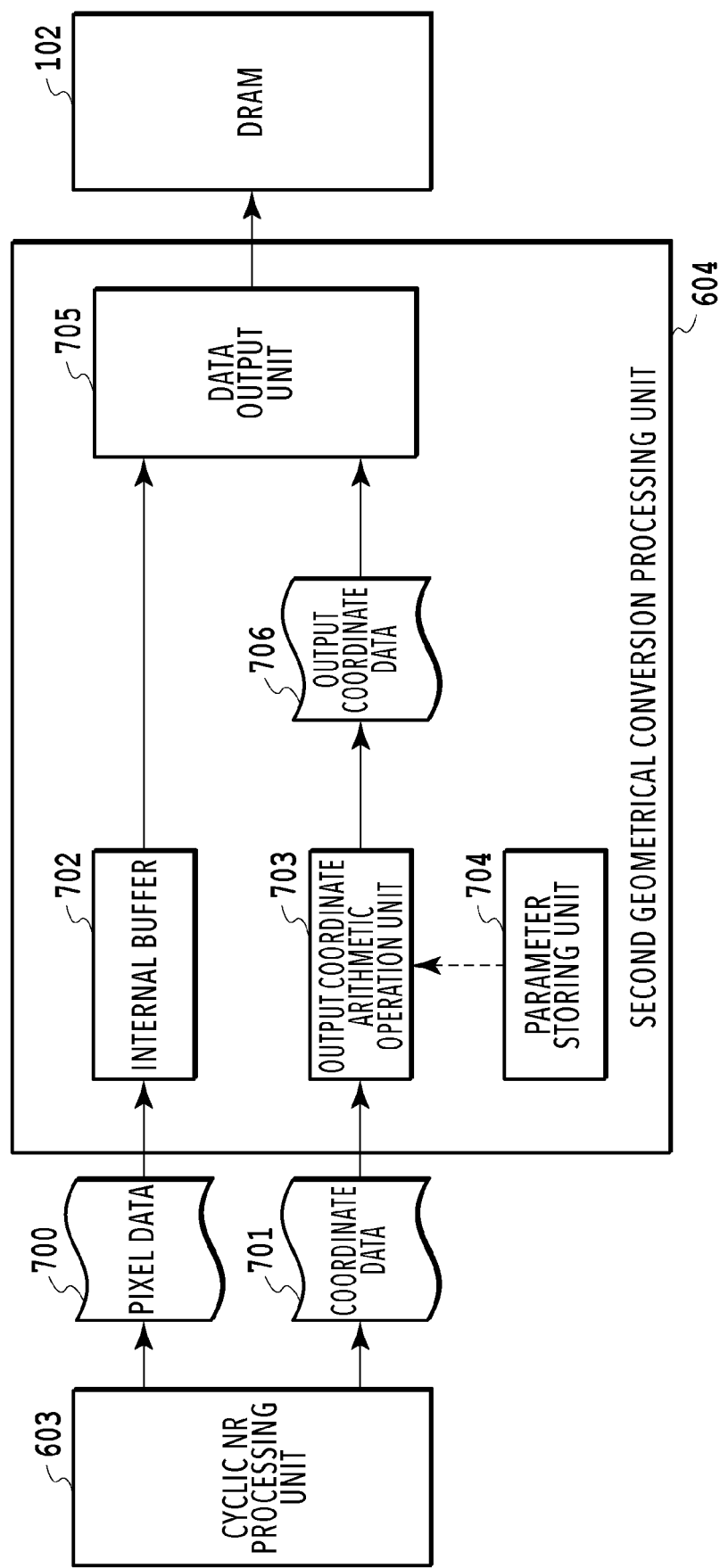
FIG. 7 is a diagram showing a configuration of a second geometrical conversion processing unit and an example of a data flow according to the second embodiment.

FIG. 7 is a diagram showing a configuration of the second geometrical conversion processing unit 604 and an example of a data flow. The second geometrical conversion processing unit 604 has an internal buffer 702, an output coordinate arithmetic operation unit 703, a parameter storing unit 704, and a data output unit 705. First, before the start of frame processing, the CPU 101 sets parameters to the parameter storing unit 704 of the second geometrical conversion processing unit 604, the parameters causing the first geometrical conversion processing unit 602 to convert the frame data with the first rotation angle into the frame data with the second rotation angle. The second geometrical conversion processing unit 604 calculates affine coefficients based on the parameters of the parameter storing unit 704. Alternatively, it may also be possible for the CPU 101 to calculate affine coefficients and to set the affine coefficients to the parameter storing unit 704. The output coordinate arithmetic operation unit 703 finds output coordinates by performing a matrix arithmetic operation based on the affine coefficients for coordinate data 701 received from the cyclic NR processing unit 603 and transfers output coordinate data 706 indicating the found output coordinates to the data output unit 705. Pixel data 700 received from the cyclic NR processing unit 603 is temporarily stored in the internal buffer 702 and then transferred to the data output unit 705 in synchronization with the corresponding output coordinate data 706 calculated by the output coordinate arithmetic operation unit 703. The data output unit 705 writes the pixel data 700 at the memory address corresponding to the received output coordinate data 706. In the case when the output coordinate data 706 is not located on a grid point, the data output unit 705 performs an interpolation arithmetic operation based on peripheral pixel values stored in the internal buffer 702 and outputs the pixel data obtained by the interpolation arithmetic operation to the memory address corresponding to the output coordinate data 706. Due to this, it is possible to store the frame data for which geometrical conversion has been performed in the DRAM 102. Further, by having a write buffer, it is possible for the data output unit 705 to increase the speed of writing to the DRAM 102 and processing by continuously transferring a plurality of pixels at a time.

Figure 8:
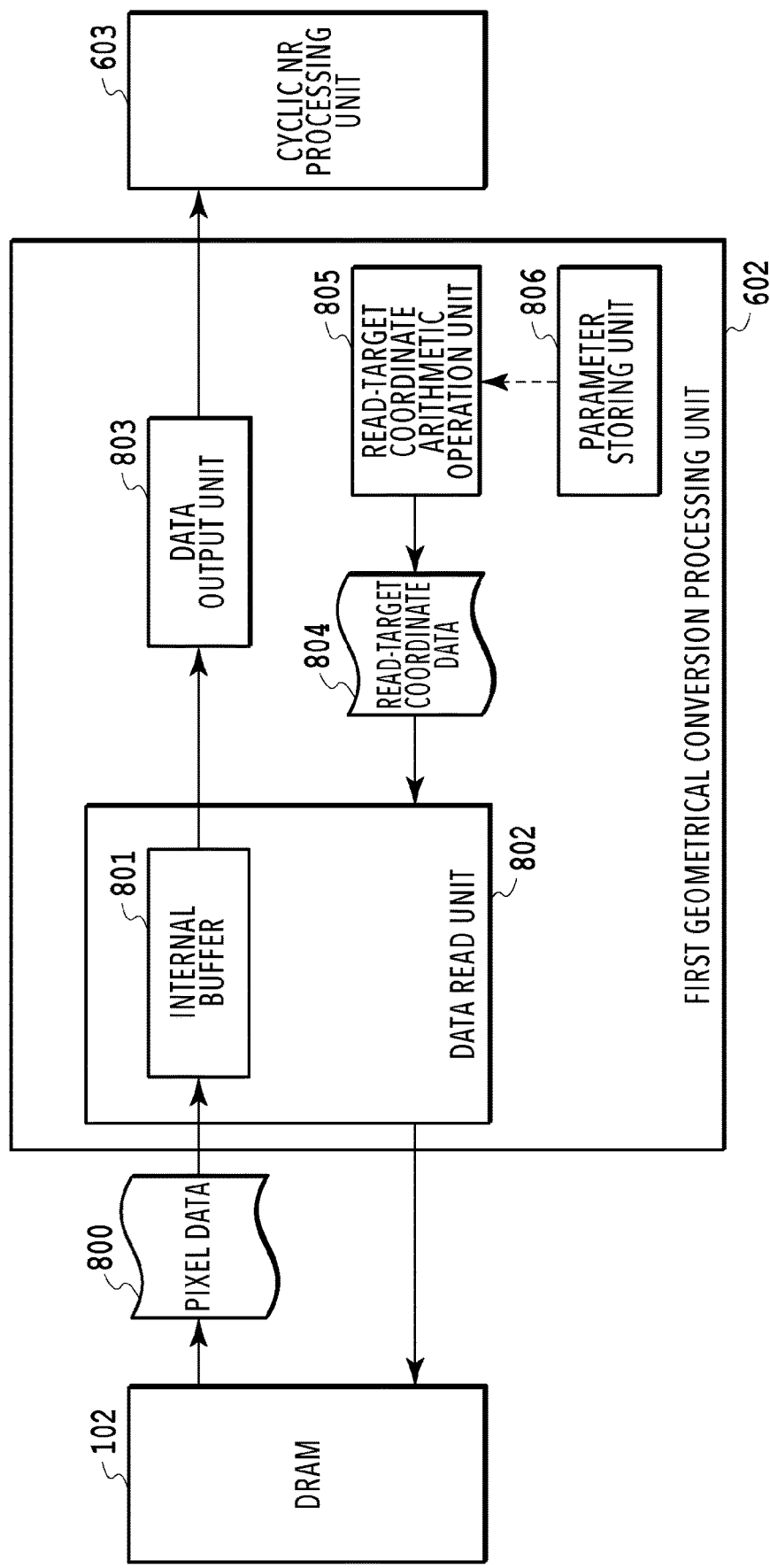
FIG. 8 is a diagram showing a configuration of a first geometrical conversion processing unit and an example of a data flow according to the second embodiment.

FIG. 8 is a diagram showing a configuration of the first geometrical conversion processing unit 602 and an example of a data flow. The first geometrical conversion processing unit 602 has an internal buffer 801, a data read unit 802, a data output unit 803, a read-target coordinate arithmetic operation unit 805, and a parameter storing unit 806. First, before the start of frame processing, the CPU 101 sets parameters to the parameter storing unit 806 of the first geometrical conversion processing unit 602, the parameters causing the first geometrical conversion processing unit 602 to convert the frame data with the second rotation angle into the frame data with the first rotation angle. The first geometrical conversion processing unit 602 calculates affine coefficients based on the parameters of the parameter storing unit 806. Alternatively, it may also be possible for the CPU 101 to calculate affine coefficients and to set the affine coefficients to the parameter storing unit 806. The read-target coordinate arithmetic operation unit 805 finds coordinates to be read by performing a matrix arithmetic operation based on the affine coefficients for the coordinate data that is received from the preceding processing unit 601, or the coordinate data that is counted based on the parameters set to the parameter storing unit 806, and outputs read-target coordinate data 804 indicating the coordinates to be read to the data read unit 802. The data read unit 802 receives the read-target coordinate data 804 and reads pixel data 800 from the corresponding memory address. Here, the data read unit 802 has the internal buffer 801 storing the pixel data received from the DRAM 102 by continuous transfer, and in the case when the pixel data corresponding to the read-target coordinate data 804 exists in the internal buffer, it is possible to omit the read command to the DRAM 102. Further, in the case when the coordinates of the read-target coordinate data 804 are not located on a grid point, the data read unit 802 further reads peripheral pixel data into the internal buffer and performs an interpolation arithmetic operation and outputs the calculated pixel data. The data output unit 803 outputs the pixel data received from the data read unit 802 to the cyclic NR processing unit 603.

As above, the configuration example in the present embodiment is described. Here, the configuration is described in which the interpolation processing is performed in the data output unit 705 or in the data read unit 802, but it is desirable for the geometrical conversion processing in the present embodiment to be reversible conversion that does not require interpolation processing. Further, the configuration is described in which the rotation processing by geometrical conversion is performed, but the present embodiment is not limited to the configuration, and a change in magnification or a change in shape by geometrical conversion may be performed. In such a case, the second geometrical conversion processing unit 604 receives frame data having a first magnification or a first shape from the cyclic NR processing unit 603 and performs geometrical conversion into frame data having a second magnification or a second shape and stores the frame data in the DRAM 102. The first geometrical conversion processing unit 602 performs geometrical conversion processing for the above-described frame data stored in the DRAM 102 and inputs the frame data converted into the first magnification or the first shape as a reference frame of the cyclic NR processing unit 603.

By making such a configuration, it is possible to omit storing frame data after NR processing and before geometrical conversion processing in the memory. As a result of this, compared to the case when the first geometrical conversion processing unit 602 is not provided, it is possible to reduce the band and the memory area corresponding to at least one frame for each piece of frame processing. Further, by making such a configuration, also in the case when it is desired to switch between on setting and off setting of geometrical conversion while frames are sequentially input, the phases of the target frame and the reference frame match with each other, and, therefore, it is possible to perform NR processing.

As explained above, according to the present embodiment, also in the case when the cyclic processing that refers to a plurality of frames and the geometrical conversion processing are performed successively, it is possible to reduce the number of times of writing of frame data to the memory and reduce the memory band and the memory area that are used.

Third Embodiment

Next, a third embodiment is explained. In the second embodiment described above, the configuration example in the case when two geometrical conversion processing units are provided and geometrical conversion processing by a coordinate arithmetic operation, such as affine transformation, is described. In the third embodiment, a configuration in which frame data is deformed by change positions of pixels using to an LUT (Look Up Table) as shown in FIG. 9 is explained.

Figure 9:
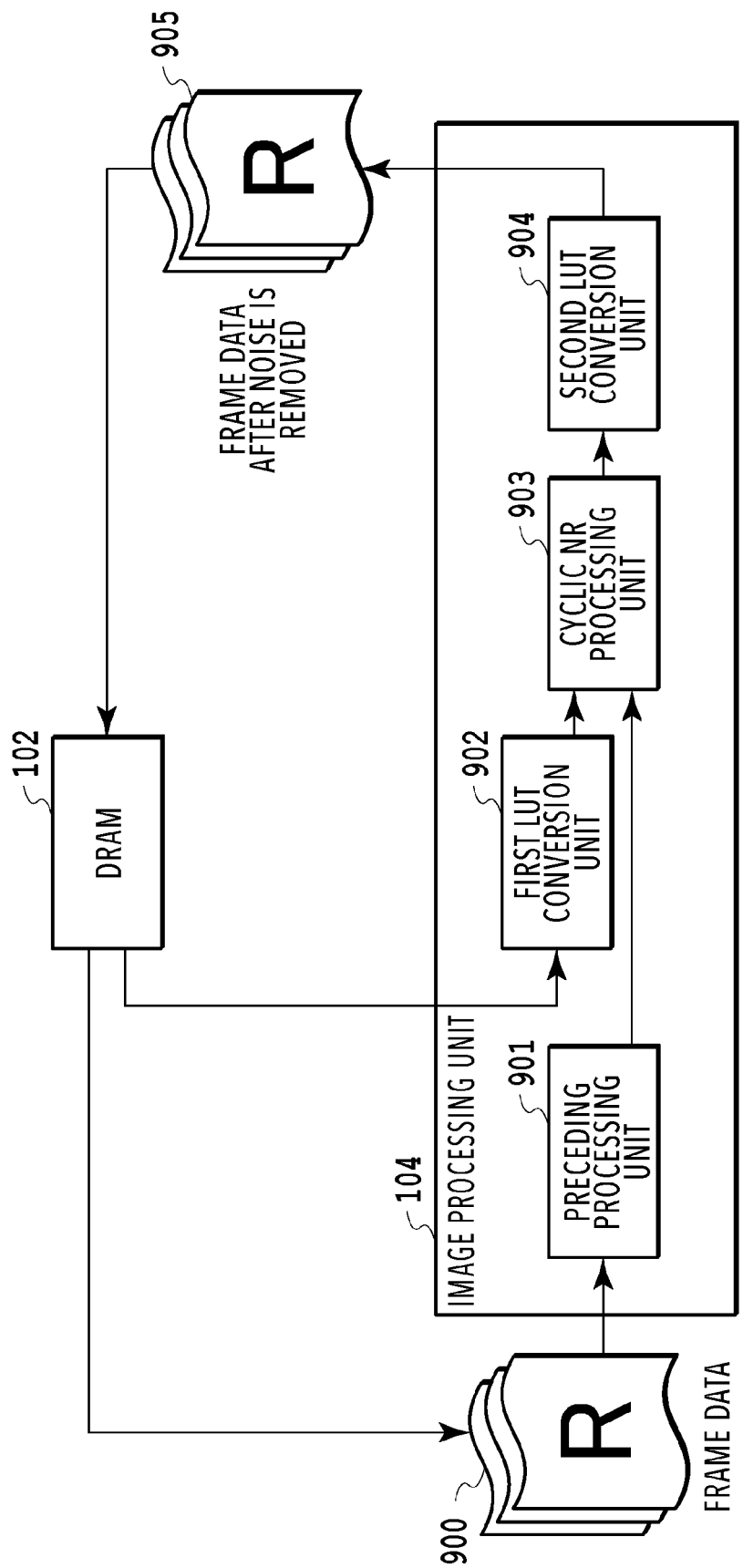
FIG. 9 is a block diagram showing a configuration example of an image processing unit according to a third embodiment.

FIG. 9 is a block diagram showing a configuration example of the image processing unit 104 in the present embodiment. The image processing unit 104 has a preceding processing unit 901, a cyclic NR processing unit 903, a first LUT conversion unit 902, and a second LUT conversion unit 904. In the image processing unit of the present embodiment, the processing of the preceding processing unit 901 and that of the cyclic NR processing unit 903 are the same as the processing of the preceding processing unit 201 and that of the cyclic NR processing unit 203, respectively, in the first embodiment, and therefore, an explanation is omitted. The first and second LUT conversion units 902 and 904 internally have an SRAM storing table values to which are referred. The CPU 101 writes table values to the SRAM of each of the first and second LUT conversion units 902 and 904. The table values are written, for example, as a one-dimensional table and used at the time of performing deformation processing in accordance with a distance from the image center point. It is possible for the first and second LUT conversion units 902 and 904 to switch between outputting input data after performing LUT conversion and outputting input data as it is. In the following, the configurations of the first LUT conversion unit 902 and the second LUT conversion unit 904 are explained with reference to FIG. 10 and FIG. 11.

Figure 10:
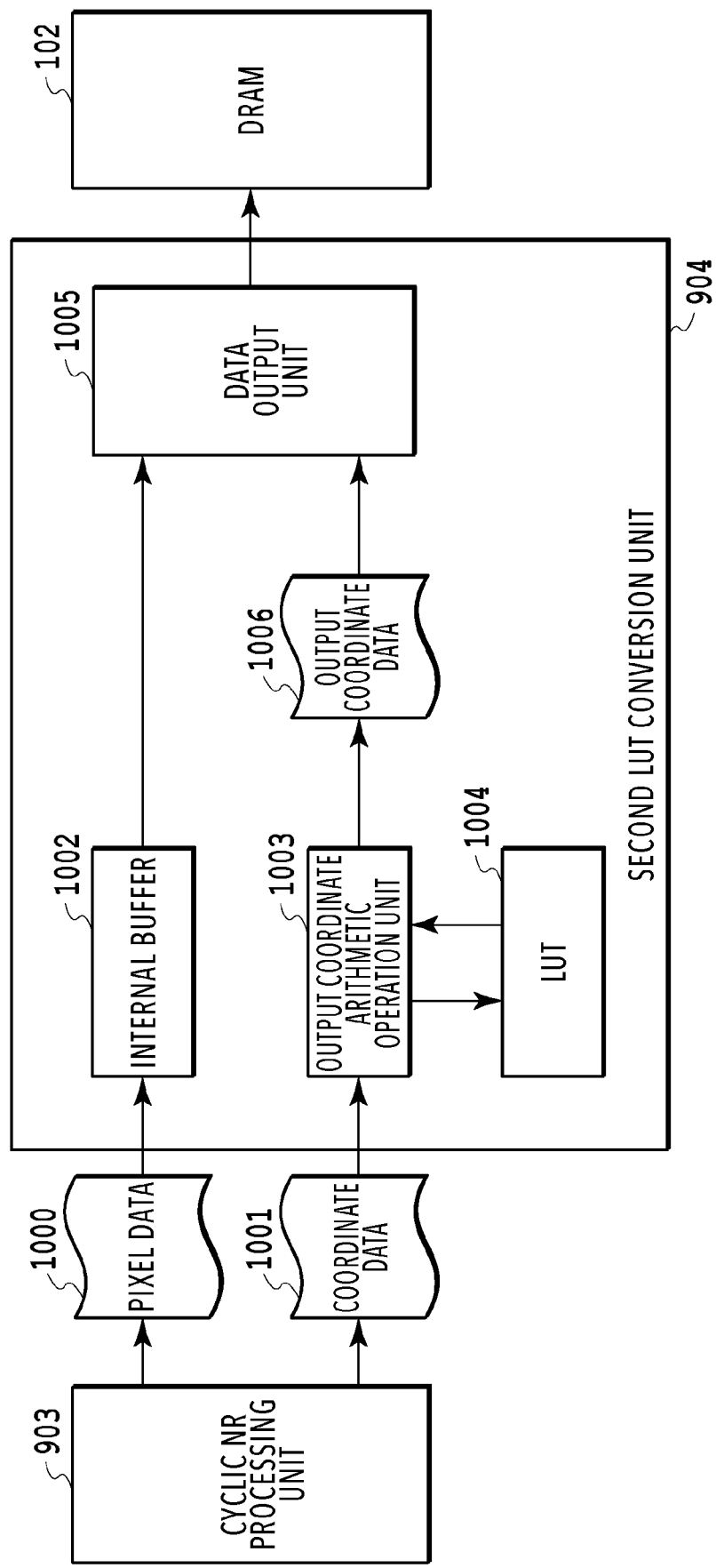
FIG. 10 is a diagram showing a configuration of a second LUT conversion unit and an example of a data flow according to the third embodiment.

FIG. 10 is a diagram showing a configuration of the second LUT conversion unit 904 and an example of a data flow. The second LUT conversion unit 904 has an internal buffer 1002, an output coordinate arithmetic operation unit 1003, an LUT 1004, and a data output unit 1005. The output coordinate arithmetic operation unit 1003 selects a table value of the LUT 1004 that is referred to for each pixel from coordinate data 1001 received from the cyclic NR processing unit 903 and the center point coordinates determined in advance. Further, the output coordinate arithmetic operation unit 1003 calculates output coordinate data 1006 by superimposing the table value that is referred to on the coordinate data and transfers the calculated output coordinate data 1006 to the data output unit 1005. Image data 1000 received from the cyclic NR processing unit 903 is temporarily stored in the internal buffer 1002 and then transferred to the data output unit 1005 in synchronization with the corresponding output coordinate data 1006 calculated by the output coordinate arithmetic operation unit 1003. The data output unit 1005 writes the image data 1000 at the memory address corresponding to the received output coordinate data 1006. The other operations of the internal buffer 1002 and the data output unit 1005 are the same as those of the internal buffer 702 and the data output unit 705 in the second embodiment, and, therefore, an explanation is omitted.

Figure 11:
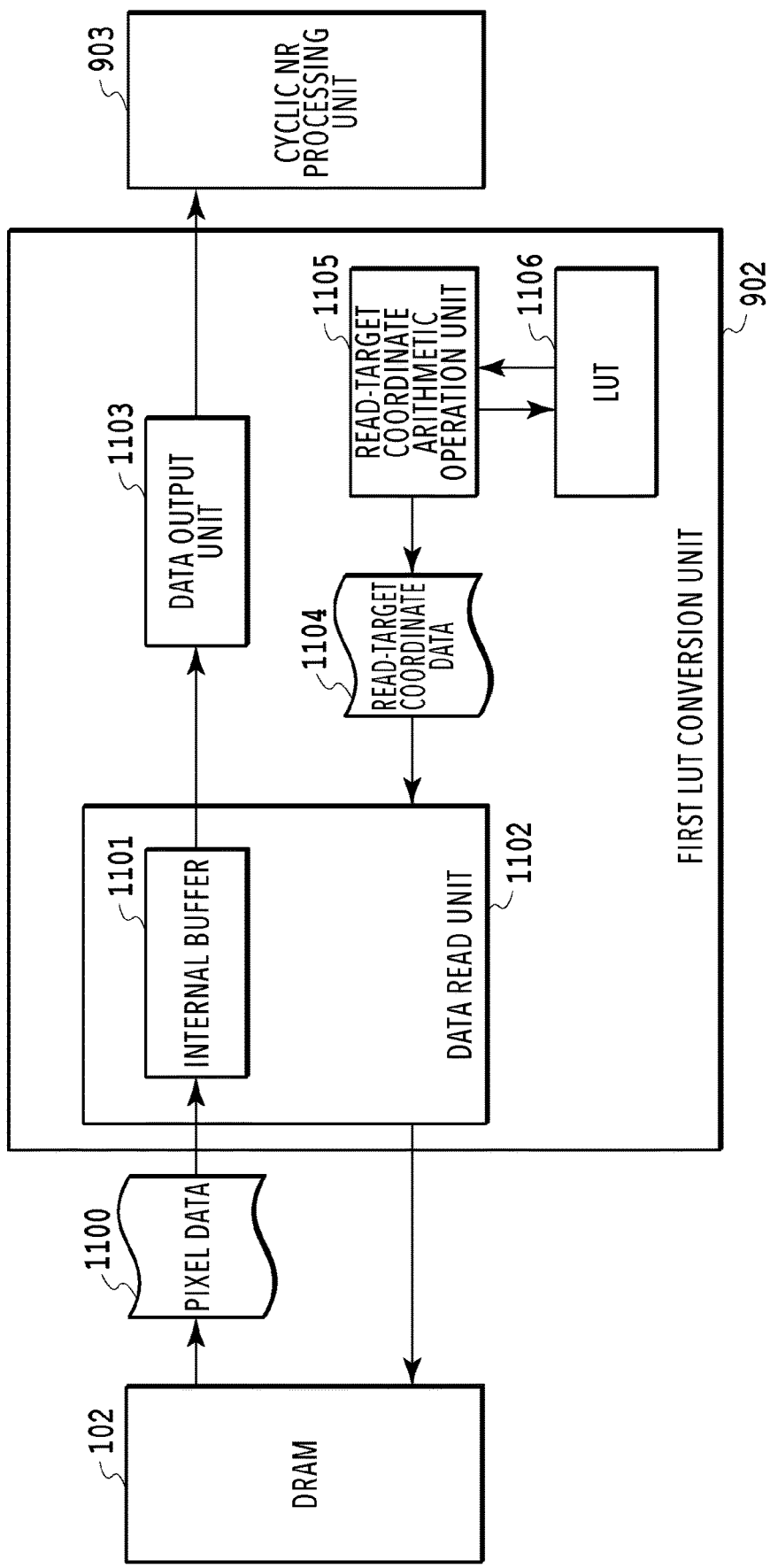
FIG. 11 is a diagram showing a configuration of a first LUT conversion unit and an example of a data flow according to the third embodiment.

FIG. 11 is a diagram showing a configuration of the first LUT conversion unit 902 and an example of a data flow. The first LUT conversion unit 902 has an internal buffer 1101, a data read unit 1102, a data output unit 1103, a read-target coordinate arithmetic operation unit 1105, and an LUT 1106. The read-target coordinate arithmetic operation unit 1105 selects a table value of the LUT 1106 that is referred to for each pixel from coordinate data received from the preceding processing unit 901, or coordinate data that is counted internally (coordinate data corresponding to pixel data 1100, which is read from the memory address corresponding to read-target coordinate data 1104) and center point coordinates determined in advance. Further, the read-target coordinate arithmetic operation unit 1105 calculates coordinates to be read by superimposing the table value that is referred to on the coordinate data and transfers the coordinates to be read to the data read unit 1102. The CPU 101 sets the LUT 1106 in advance so that the frame data matches with the frame data before LUT conversion processing by performing conversion processing of the first LUT conversion unit 902 for the frame data after conversion processing of the second LUT conversion unit 904. By doing so, it is possible to perform cyclic NR processing and LUT conversion processing successively without storing image data after NR processing and before LUT conversion onto the DRAM 102. The processing of the data read unit 1102 including the internal buffer 1101, and that of the data output unit 1103 are the same as that of the data read unit 802 and that of the data output unit 803 in the second embodiment, and, therefore, a detailed description is omitted.

Here, as an example, the method of calculating coordinates by referring to a one-dimensional table is described, but it may also be possible to calculate coordinates by referring to a two-dimensional table or a three-dimensional table. Further, the method of performing an arithmetic calculation from the table value that is referred to is not limited to the coordinate arithmetic operation. For example, it may also be possible to store attribute values in an LUT and switch to correction processing in accordance with the attribute. Further, a configuration is also considered, in which geometrical conversion and translation or correction processing are performed at the same time in combination with calculation of coordinates by affine transformation as shown in the second embodiment. Furthermore, in the present embodiment, the configuration is explained, in which the first LUT conversion unit 902 and the second LUT conversion unit 904 store different LUTs, but the configuration may be one in which the image processing unit 104 is caused to store one LUT therein and the LUT is shared by the first and second LUT conversion units 902 and 904. In particular, in the configuration in which the coordinate arithmetic operation is performed, it is possible to easily implement the present embodiment by referring to the same LUT and performing the same arithmetic operation for the output coordinates and the coordinates to be read.

By making the configuration such as this, it is possible to omit storing frame data after NR processing and before coordinate conversion in the memory. As a result of this, compared to the case when the first LUT conversion unit 902 is not provided, it is possible to reduce the band and the memory area corresponding to at least one frame for each piece of frame processing. Further, also in the case when it is desired to switch between on setting and off setting of coordinate conversion while frames are sequentially input, due to this configuration, the pixel coordinates of the target frame and the reference frame always match with each other, and, therefore, it is possible to perform NR processing.

As explained above, according to the present embodiment, also in the case when the cyclic processing that refers to a plurality of frames and the LUT conversion processing are performed successively, it is possible to reduce the number of times of writing frame data to the memory and to reduce the memory band and the memory area that are used.

Fourth Embodiment

Next, a fourth embodiment is explained. In the first to third embodiments described so far, the configuration is taken as an example, in which, as the image processing, the superimposing processing is performed by referring to the frame data earlier in terms of time, as represented by the cyclic NR processing. In the present embodiment, a configuration is taken as an example, in which, as image processing, processing to compose frame data generated under a plurality of different conditions, as represented, for example, by an HDR (High Dynamic Range) processing, is performed. The HDR processing is a technique capable of representing a wider dynamic range by composing image data generated under a plurality of exposure conditions. As one example of the present embodiment, a case is explained where frame data under a plurality of composition conditions is output based on frame data recorded under four different exposure conditions and further, inversion processing is performed for the output data. However, it is possible to apply the present embodiment to image processing that refers to a plurality of pieces of frame data and the processing-target image may be any image. For example, it is also possible to apply the present embodiment to the case when noise reduction, resolution conversion, and HDR processing are performed for a plurality of still images obtained by a camera array, or the like, capturing the same scene by referring to the plurality of still images. Further, it is also possible to apply the present embodiment to the case when the geometrical conversion processing, the LUT conversion processing, and so on, which are explained in the first to third embodiments, are performed, not limited to the case when the above-described inversion processing is performed for output data. In the following, a configuration and a flow in the present embodiment are explained with reference to FIG. 12 and FIG. 13.

Figure 12:
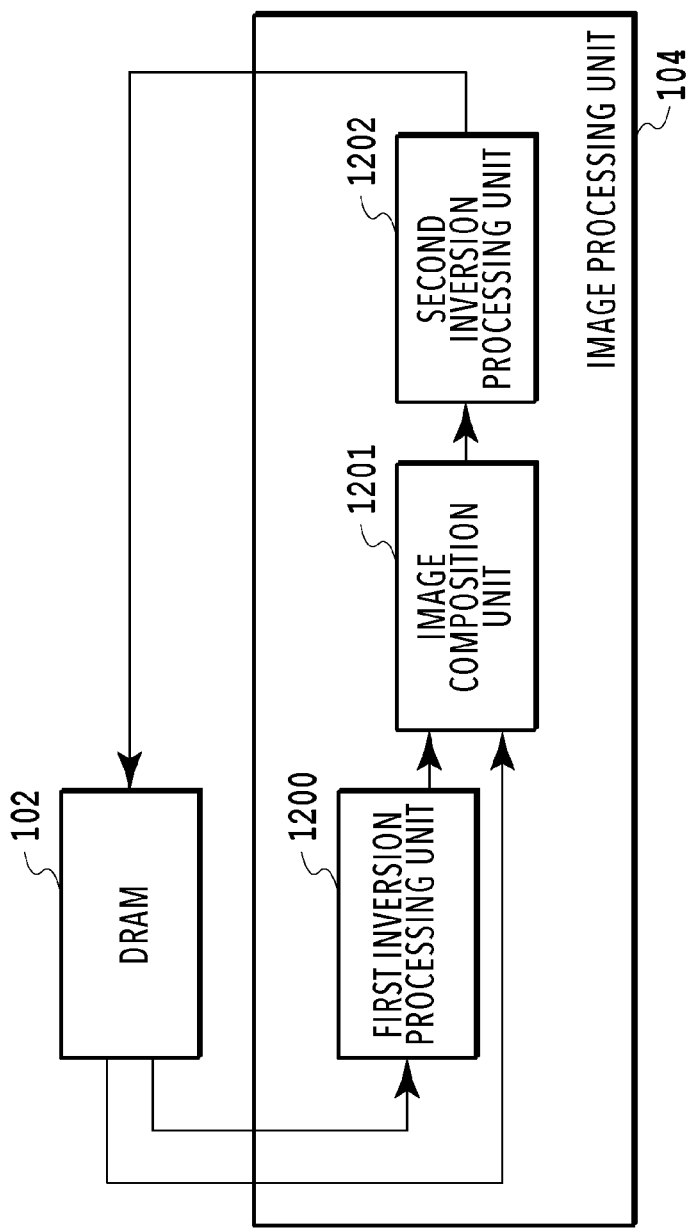
FIG. 12 is a block diagram showing a configuration example of an image processing unit according to a fourth embodiment.

FIG. 12 is a block diagram showing a configuration example of the image processing unit 104 in the present embodiment. The image processing unit 104 has a first inversion processing unit 1200, a second inversion processing unit 1202, and an image composition unit 1201. The image composition unit 1201 performs composition processing to superimpose two pieces of frame data that are input for each pixel. The second inversion processing unit 1202 receives output data of the image composition unit 1201, performs inversion processing, and writes the output data to the DRAM 102. The first inversion processing unit 1202 reads, in the case when the image composition unit 1201 requires already-composed frame data, the frame data from the DRAM 102, performs inversion processing, and transfers the frame data to the image composition unit 1201. The processing performed by the first and second inversion processing units 1200 and 1202 is the same as that performed by the first and second inversion processing units 202 and 204 in the first embodiment, and, therefore, details are omitted.

Figure 13:
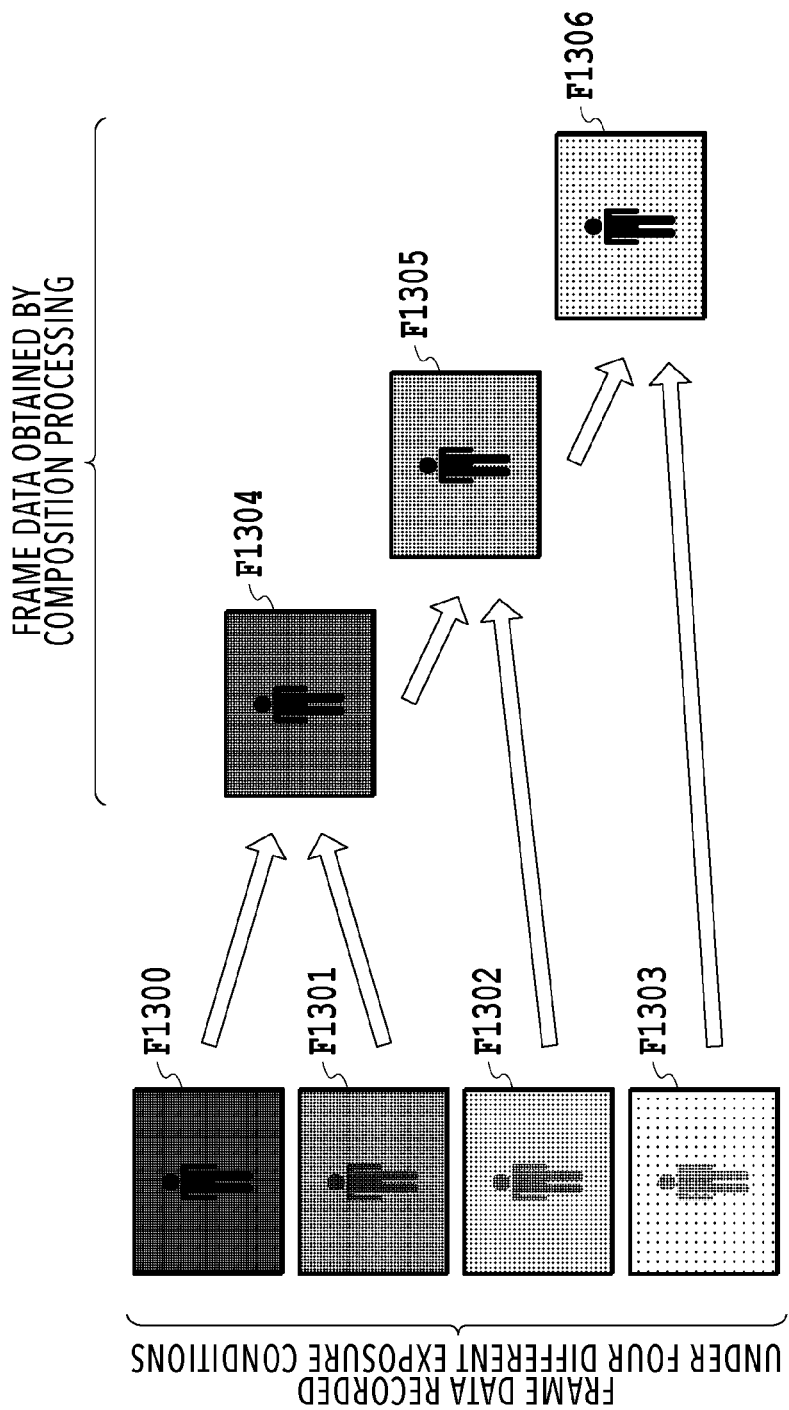
FIG. 13 is a diagram schematically showing frame data recorded under four different exposure conditions and frame data obtained by composing the frame data.

Next, with reference to FIG. 13, a flow of composing four frames is explained. FIG. 13 is a diagram schematically showing frame data (F1300 to F1303) recorded under four different exposure conditions and frame data (F1304 to F1306) obtained by composing the frame data (F1300 to F1303). The frame data F1300 to F1303 are data that the image input unit 130 stores in the DRAM 102. In the present embodiment, it is supposed that frame data composed under three different conditions is generated in the inverted state. That is, it is supposed that the frame data F1304 that composes the frame data F1300 and the frame data F1301 is generated in the inverted state. Further, it is supposed that the frame data F1305 that composes the frame data F1300 to F1302 is generated in the inverted state. Furthermore, it is supposed that the frame data F1306 that composes the frame data F1300 to F1303 is generated in the inverted state.

First, the image composition unit 1201 reads the frame data F1300 and the frame data F1301 from the DRAM 102 and stores the image data for which the composition processing has been performed in the DRAM 102 via the second inversion processing unit 1202. By repeating the composition processing corresponding to one frame, it is possible to store the inverted frame data F1304 on the DRAM 102. Following the above, the frame data F1305 is generated. It is possible to substitute the composition of the frame data F1304 and the frame data F1302 for the frame data F1305. However, in the present embodiment, the frame data F1304 saved in the DRAM 102 is the inverted frame data that is finally necessary. In the composition processing, the frame data before inversion is used, and, therefore, in order to reduce the composition processing, the frame data F1304 before inversion should also be stored on the DRAM 102. However, in the case when both the inverted frame data and the frame data before inversion are stored in the DRAM 102, an increase in the memory band and the memory use area will result. Consequently, in the present embodiment, the first inversion processing unit 1200 is provided and in the case when the inverted frame data stored on the DRAM 102 is used for the composition processing, the frame data is inverted again via the first inversion processing unit 1200 and is input to the image composition unit 1201. By doing so, it is possible to reduce the composition processing while suppressing the number of times the frame data is written to the memory (DRAM 102). In the case shown in FIG. 13, also in the generation of the frame data F1306, the frame data F1305 that is inverted and stored is read via the first inversion processing unit 1200 and the frame data F1303 is read directly from the DRAM 102. By doing so, it is possible to obtain the same effect.

As explained above, according to the present embodiment, also in the case when the processing to superimpose the frame data generated under different conditions and the inversion processing, and the like, are performed successively, it is possible to reduce the number of times the frame data is written to the memory and to reduce the memory band and the memory area that are used.

Fifth Embodiment

Figure 14B:
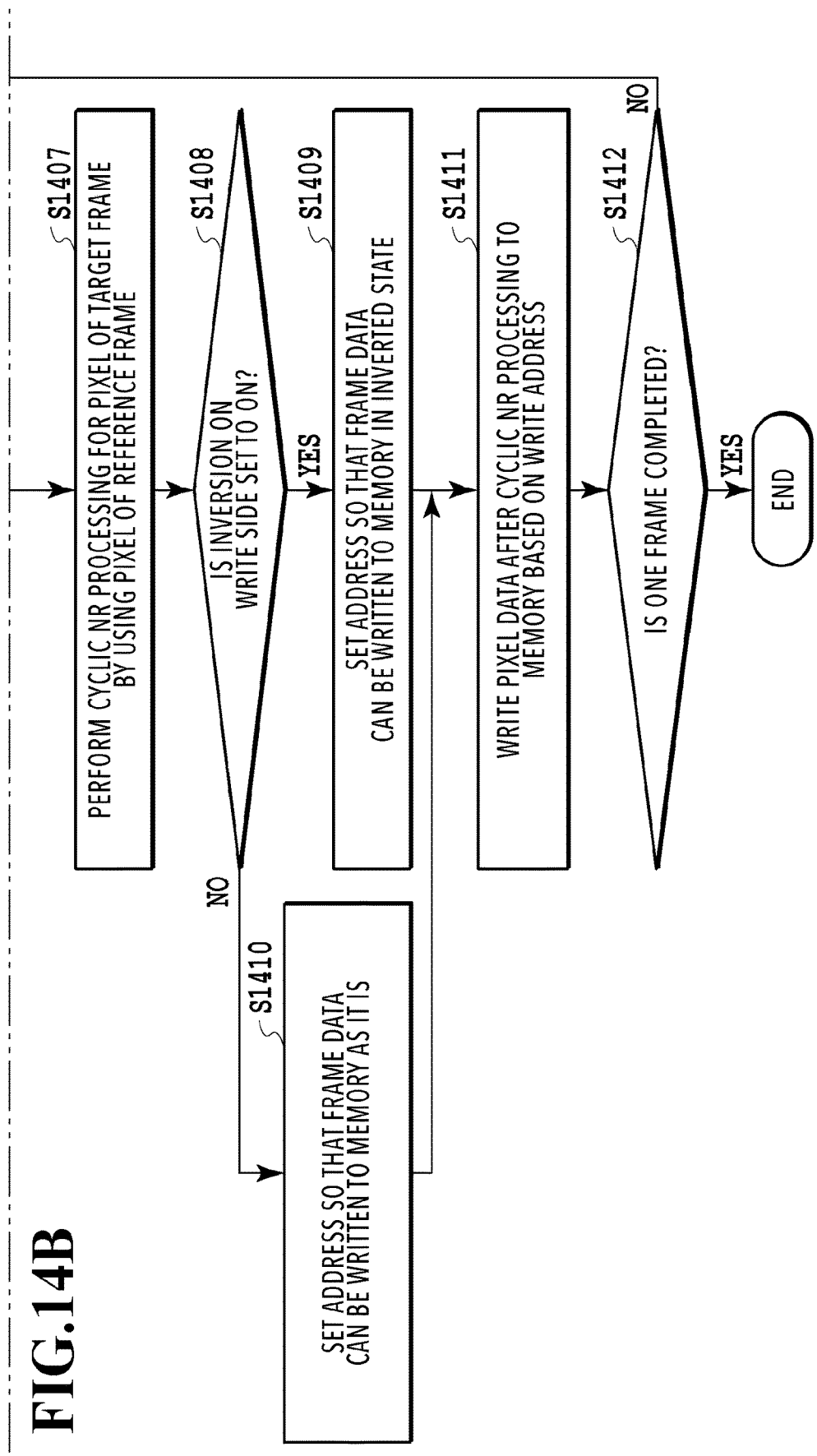
FIG. 14B is a flowchart showing processing performed by the image processing unit.

So far, in the first to fourth embodiments, the case is described in which each component and each piece of processing of the image processing unit 104 are implemented by hardware. However, the image processing unit 104 is implemented not only by hardware and, for example, it may also be possible to implement part or all of the image processing unit 104 by software by using a CPU. In a fifth embodiment, the operation in the case when all the pieces of processing of the image processing unit 104 are implemented by software is explained. In this case, each configuration of the image processing unit 104 shown in FIG. 1 is a function configuration implemented by the CPU 101. In the present embodiment, the case is taken as an example in which cyclic NR processing and inversion processing are performed by the image processing unit 104, but, as described so far in the first to fourth embodiments, the case is not limited to the example. FIG. 14A and FIG. 14B are, as a whole, a flowchart showing processing performed by the image processing unit 104. A CPU (not shown schematically) dedicated to the image processing unit 104 reads a program that implements processing along the flow shown in FIG. 14A and FIG. 14B and causes the program to perform the processing. Further, in the following explanation, as the CPU that performs image processing of the image processing unit 104, it is supposed to use a CPU different from the CPU 101, but the CPU 101 may perform the processing.

The image processing unit 104 performs the processing along the flow shown in FIG. 14A and FIG. 14B in units of frames.

First, the image processing unit 104 receives various setting values necessary for frame processing as well as starting the frame processing (step S1400). The setting values referred to here include the number of pixels processed at a time, the on setting and off setting of inversion processing on the read side, and the on setting and off setting of inversion processing on the write side. Next, the image processing unit 104 reads pixel data corresponding to the set number of pixels from the frame data written to the memory by the image input unit 103 (step S1401) and performs predetermined image processing for the pixel data of the read target frame (step S1402). This is taken to be pixel data of the target frame. Following the above, the image processing unit 104 switches the settings of the read address of the frame that is referred to in accordance with the on setting or off setting of the inversion processing on the read side set by the CPU 101 (step S1403). In the case when the inversion processing on the read side is set to on, the image processing unit 104 sets the read address so that it is possible to read the pixel data of the reference frame stored in the memory in the opposite order both in the main scanning direction and in the sub scanning direction (step S1404). For example, in the case when the image processing unit 104 handles the pixel data corresponding to 32 bytes at a time, it is sufficient to set the read address so that it is possible to read from the address 32 bytes before the final address at which the frame data is stored. On the other hand, in the case when the inversion processing on the read side is set to off, the image processing unit 104 sets the read address so that it is possible to read the pixel data as it is in the same order as the read order of the target frame (step S1405). In both the cases, the image processing unit 104 reads the pixel data of the reference frame corresponding to a predetermined number of pixels based on the set read address (step S1406). Then, the image processing unit 104 superimposes the pixel data of the corresponding reference frame on the pixel data of the target frame and performs cyclic NR processing (step S1407). Next, the image processing unit 104 writes the pixel data after the cyclic NR processing to the memory. Here, as in the case with the time of reading, the image processing unit 104 switches the settings of the write address in accordance with the on setting or the off setting of the inversion processing on the write side set by the CPU (step S1408). In the case when the inversion setting on the write side is set to on, the image processing unit 104 sets the write address so that it is possible to invert the pixel data and write the pixel data to the memory (step S1409). On the other hand, in the case when the inversion processing on the write side is set to off, the image processing unit 104 sets the write address so that it is possible to write as it is in the raster order (step S1410). Then, the image processing unit 104 writes the pixel data after the cyclic NR processing to the memory based on the set write address (step S1411). Lastly, the image processing unit 104 repeatedly performs step S1401 to step S1411 until the processing corresponding to one frame is completed and checks that the processing corresponding to one frame is completed, and completes the frame processing (step S1412). By performing the processing in this process, it is possible to perform the cyclic NR processing and the inversion processing successively without writing the frame data before the inversion processing, which is obtained at step S1407 to the memory, while suppressing the capacity of the local memory and the cache storing image data.

As explained above, according to the present embodiment, also in the case when the cyclic NR processing and the inversion processing are performed by implementing software, it is possible to reduce the number of times the frame data is written to the memory, and to reduce the memory band and the memory area that are used.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

According to the present invention, in an image processing apparatus that performs processing that refers to data of a plurality of frames by using a memory storing the frame data and rotation processing successively, it is possible to reduce the memory band and the memory area that are used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising a memory being capable of storing output image data obtained by converting image data in units of frames, the image processing apparatus comprising:
    an input unit configured to input image data of a target frame;
    a first processing unit configured to perform a first processing for output image data of a reference frame related to the target frame, which is stored in the memory, to change positions of pixels in the output image data;
    an image processing unit configured to perform image processing for the image data of the target frame input by the input unit based on the output image data of the reference frame processed by the first processing unit; and
    a second processing unit configured to perform a second processing, the second processing being according to the first processing, for the image data of the target frame for which image processing has been performed by the image processing unit and to store the processed image data in the memory as output image data of the target frame.

2. The image processing apparatus according to claim 1, wherein
    the first processing unit converts the output image data of the reference frame to the state before being subjected to the second processing by the second processing unit.

3. The image processing apparatus according to claim 1, wherein
the first processing by the first processing unit and the second processing by the second processing unit are inversion processing.

4. The image processing apparatus according to claim 3, wherein
the input unit inputs image data in a first pixel order,
the first processing unit inverts image data in a second pixel order different from the first pixel order into image data in the first pixel order, and
the second processing unit inverts the image data in the first pixel order into the image data in the second pixel order.

5. The image processing apparatus according to claim 3, wherein
the first processing unit performs inversion processing by performing at least one of changing a write order to the memory and changing a top address of a write destination to the memory.

6. The image processing apparatus according to claim 5, wherein
the second processing unit performs inversion processing by performing at least one of changing a read order from the memory and changing a read top address from the memory.

7. The image processing apparatus according to claim 3, further comprising a setting unit configured to perform setting to switch whether or not to perform inversion processing in units of frames for the first processing unit and the second processing unit.

8. The image processing apparatus according to claim 1, wherein the first processing by the first processing unit and the second processing by the second processing unit are geometrical conversion.

9. The image processing apparatus according to claim 8, wherein
the input unit inputs image data with a first rotation angle,
the first processing unit performs geometrical conversion for image data with a second rotation angle different from the first rotation angle into the image data with the first rotation angle, and
the second processing unit performs geometrical conversion for the image data with the first rotation angle into the image data with the second rotation angle.

10. The image processing apparatus according to claim 8, wherein
the input unit inputs image data with a first magnification,
the first processing unit performs geometrical conversion for image data with a second magnification different from the first magnification into the image data with the first magnification, and
the second processing unit performs geometrical conversion for the image data with the first magnification into the image data with the second magnification.

11. The image processing apparatus according to claim 8, wherein
the first processing unit performs the geometrical conversion by performing geometrical conversion for read-target coordinate data indicating coordinates to be read of a pixel of the image data stored in the memory and by outputting a pixel corresponding to the read-target coordinate data, and
the second processing unit performs the geometrical conversion by performing geometrical conversion for output coordinate data indicating output coordinates of a pixel of the image data and by storing a pixel corresponding to the output coordinate data in a corresponding area of the memory.

12. The image processing apparatus according to claim 11, wherein
the first processing unit performs geometrical conversion for the read-target coordinate data in accordance with set parameters, and
the second processing unit performs geometrical conversion for the output coordinate data in accordance with the set parameters.

13. The image processing apparatus according to claim 11, wherein
the first processing unit performs geometrical conversion for the read-target coordinate data by referring to an Look Up Table (LUT),
the second processing unit performs geometrical conversion for the output coordinate data by referring to an LUT.

14. The image processing apparatus according to claim 8, further comprising a setting unit configured to perform setting to switch whether or not to perform the geometrical conversion in units of frames for the first processing unit and the second processing unit.

15. The image processing apparatus according to claim 1, wherein
the reference frame is a frame before the target frame, and
wherein the image processing unit performs cyclic noise reduction processing as the image processing.

16. The image processing apparatus according to claim 1, wherein
the image data of the reference frame is image data captured at the same timing under an exposure condition different from that of the target frame, or image data obtained by composing image data captured under different exposure conditions,
wherein the image processing unit performs HDR processing, which is composing at least two image data under different exposure conditions as the image processing.

17. A control method in an image processing apparatus comprising a memory being capable of storing output image data obtained by converting image data in units of frames, the method comprising the steps of:
inputting image data of a target frame;
performing a first processing for output image data of a reference frame related to the target frame, which is stored in the memory, to change positions of pixels in the output image data;
performing image processing for the input image data of the target frame based on the output image data of the reference frame processed the first processing; and
performing a second processing, the second processing being according to the first processing, for the image data of the target frame for which the image processing has been performed and to store the processed image data in the memory as output image data of the target frame.

18. A non-transitory computer readable storage medium storing a program for causing a computer to perform a control method in an image processing apparatus comprising a memory being capable of storing output image data obtained by converting image data in units of frames, the method comprising the steps of:
inputting image data of a target frame;

performing a first processing to output image data of a reference frame related to the target frame, which is stored in the memory, to change positions of pixels in the output image data;

performing image processing for the input image data of the target frame based on the output image data of the reference frame processed the first processing; and performing a second processing, the second processing being according to the first processing, for the image data of the target frame for which the image processing has been performed and to store the processed image data in the memory as output image data of the target frame.

* * * * *